Sept. 25, 1956

J. R. LANE 2,764,033

VARIABLE-SPEED DRIVE FOR ROTARY SHEARS

Filed July 15, 1953

*Inventor:*
JOHN R. LANE,
by: Donald G. Dalton
his Attorney.

Sept. 25, 1956 J. R. LANE 2,764,033
VARIABLE-SPEED DRIVE FOR ROTARY SHEARS
Filed July 15, 1953 2 Sheets-Sheet 2
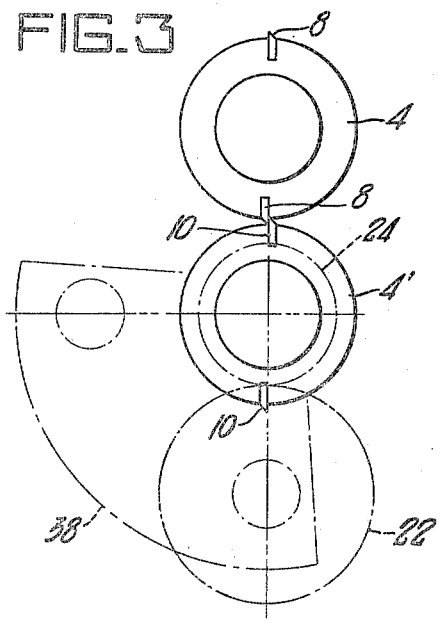
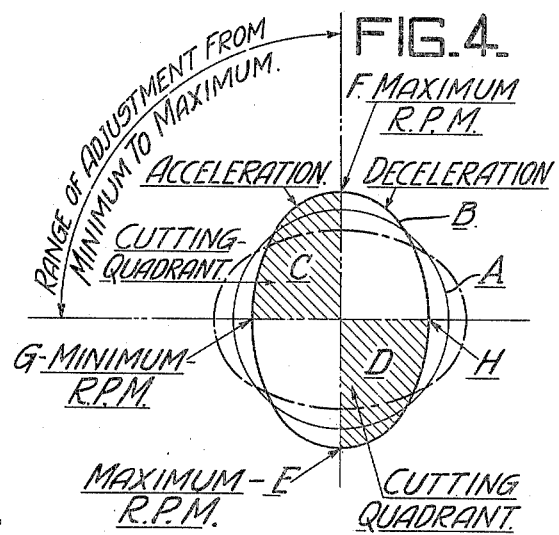
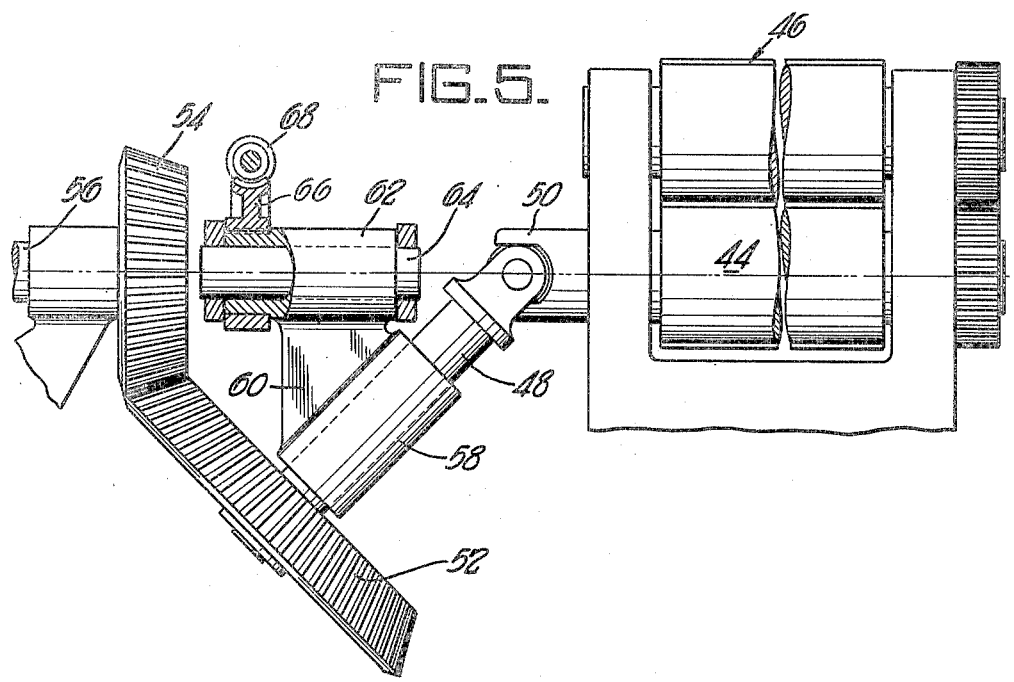
Inventor:
JOHN R. LANE,
by: Donald G. Dalton
his Attorney.

United States Patent Office 2,764,033
Patented Sept. 25, 1956

2,764,033

VARIABLE-SPEED DRIVE FOR ROTARY SHEARS

John R. Lane, Pittsburg, Calif., assignor to United States Steel Corporation, a corporation of New Jersey Application July 15, 1953, Serial No. 368,133

3 Claims. (Cl. 74—393)

The present invention relates to flying shears of the rotary type used for cutting advancing strip into sheets of predetermined length and more particularly to an improved drive for such shears.

In the operation of cutting oncoming continuously advancing metal strip into sheets, it is greatly desired that means be provided whereby the speed of the shearing element may be momentarily accelerated at the time each cut is made. Such acceleration is necessary so that the cutting blades may be moved out of the path of the leading end of the oncoming strip each time a cut is made to avoid buckling, tearing or otherwise distorting the metal. I propose to achieve such variation in the rotative speed of the shearing elements by providing a novel coupling intermediate the shear driving means and the shearing elements for transforming the uniform rotative movement of the shear driving means into nonuniform rotative movement of the shearing elements.

It is, accordingly, an object of my invention to provide a variable-speed drive for a rotary shear for converting uniform rotary motion derived from a conventional source of power into a predetermined operating cycle of the shear which comprises a combination of accelerating and decelerating phases.

It is another object of my invention to provide a variable-speed drive of the character described in the above object wherein adjustment of the magnitude of acceleration can be easily and accurately made.

These and other objects will become more apparent after referring to the following specification and attached drawings, in which:

Figure 3 is an end view of the shear drums of Figure 1;

Figure 4 is a diagrammatic illustration of the cutting cycle produced by my invention; and Figure 5 is a side elevation of a modification of my invention.

Figure 1:
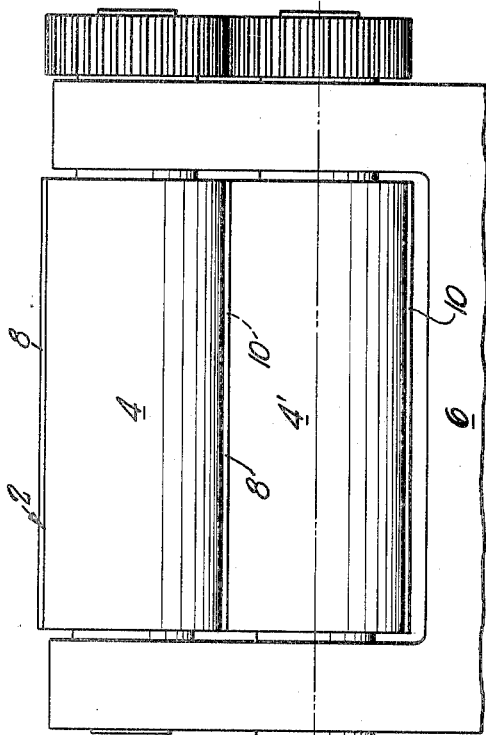
Figure 1 is a side elevation showing a rotary shear equipped with the variable-speed drive of my invention.

Referring more particularly to the drawings, reference numeral 2 designates a flying shear of the conventional type which is comprised of a pair of shear heads 4 and 4' rotatably mounted in a housing 6 and connected together for synchronized rotation by means of conventional gearing. Each of the shear heads 4 and 4' is provided with a pair of diametrically opposed shear knives 8 and 10 respectively. The shear drums 4 and 4' are so mounted and synchronized that one revolution of the shear heads results in two cuts on strip advancing between the shear drums. The rotative speed of the shear drums is adjusted according to the length of the sheet desired to be cut from the advancing strip in the customary manner. The features thus far described are conventional and are not claimed as part of the present invention the details of which will now be described.

The shaft 12 of the shear head 4' projects outwardly of the housing 6 and has connected thereto an intermediate shaft 14 by means of a universal coupling 16. The shaft 14 is disposed at an angle of approximately 30° to an extension of the axis of the shear drum 4', as best shown in Figure 1, and is connected at its opposite end to a second shaft 18 by means of a second universal coupling 20. A spur gear 22 is keyed or otherwise rigidly attached to the end of the shaft 18 opposite the universal coupling 20 in mesh with a spur gear 24 which is rigidly affixed to the end of a drive shaft 26. The axis of the drive shaft 26 is coplanar with the axis of the shear drum 4'. With this construction, uniform rotative movement is imparted to the shaft 18 and coupling 20 from the drive shaft 26 through the gears 24 and 22. The universal coupling 20 transfers the rotation from the shaft 18 to the intermediate shaft 14 which in turn rotates the shear drum 4' through the coupling 16. The offset position of the intermediate shaft 14 relative to the axis of the shear drum 4' causes the constant input speed to the first coupling 20 to result in a fluctuating speed output from the coupling 16.

Figure 2:
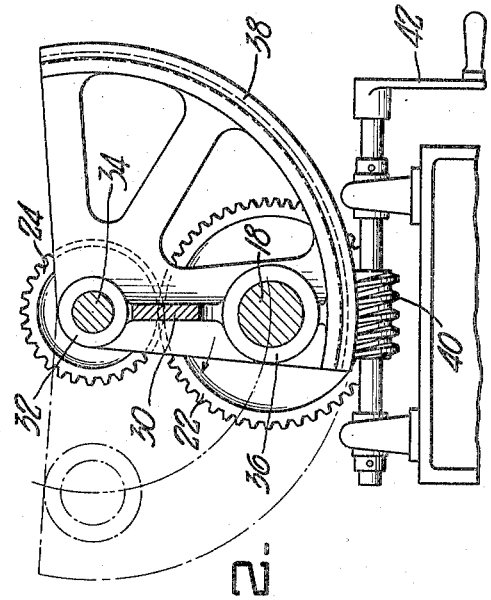
Figure 2 is a sectional view taken on the line II—II of Figure 1.

Intermediate shaft 14 rotates in a sleeve 28 which is disposed around the shaft intermediate the couplings 16 and 20. A bracket 30 made up of a web member projects from the wall of the sleeve 28 angularly toward the gear 22. The upper portion of the bracket 30 is formed of two spaced bearings 32 which are rotatably supported on a fixed pivot shaft 34. The axis of the pivot shaft is in line with the axes of the shear drum 4' and the drive shaft 26, as best shown in Figure 1. A bearing sleeve 36 is integral with the bracket 30 opposite bearings 32 for rotatably supporting the shaft 18. As best shown in Figures 1 and 2, a worm gear sector 38 is integral with and connects the bearings 32 and 36 so that the drive assembly consisting of the shaft 18 with its gear 22, coupling 20, intermediate shaft 14, coupling 16 and the sleeve 28 may be rotated as a unit in a 90° arc about the pivot shaft 34. The means for rotating the worm gear sector may be a worm 40 the shaft of which has a handle 42 attached thereto so that the worm sector gear may be manually adjusted.

The offset position of the intermediate shaft 14 together with the coupling attachment of the shaft with the shear drum 4' by means of universal coupling 16, wherein the coupling pins are set at 90° to each other, causes a constant speed input to the coupling 20 to result in a fluctuating speed output to the shear drum 4' from the coupling 16. The resultant motion of the shear drums 4 and 4' so produced consists of four distinct phases, each within a quadrant of a circle of revolution of the shear drums. Alternate acceleration and deceleration form the complete cycle. Each half cycle or revolution consists of an acceleration and deceleration phase which form one cutting arc. This motion permits two cuts per shear head revolution with the accelerating motion taking place during the cutting.

In operation, the drive shaft 26 is revolved by means of a constant speed motor (not shown) and drives the shear drums 4 and 4' through the gears 24 and 22, shaft 18, coupling 20, intermediate shaft 14, and coupling 16. The speed of the shear drums will accelerate and decelerate twice per revolution through the coupling arrangement as described hereinbefore. By revolving the drive assembly about the pivot shaft 34 within a 90° arc, by means of the worm 40 and handle 42, the degree of acceleration can be altered from zero to maximum at the time of cut. This is illustrated by the diagrammatic cutting cycle curve of Figure 4 in which the constant input speed from the drive shaft 26 is shown as a circle A and the fluctuating speed imparted to the shear drums is shown as a solid line ellipse B. The quadrants in which the cutting is done are illustrated as shaded portions C and D of the ellipse. The points of maximum speed being coincidental with the points of cut which are designated by the reference characters E and F. Revolving of the drive assembly in effect revolves the fluctuating output curve B about its center without changing the strip position or input speed to the shear heads but does change the shear head speed at the time of cut, depending upon the rotated position of the curve B. The points of minimum acceleration are designated as G and H, respectively, and are 90° removed from the points of maximum acceleration and 180° removed from each other. Thus it may be seen that the degree of acceleration at the time of cut may be easily varied by rotating the drive assembly so that the cutting takes place at any desired point along the cutting quadrant from minimum to maximum acceleration.

Figure 5 illustrates a modified embodiment of my invention wherein the shear drum 44 of a flying shear 46 is connected to a shaft 48 by means of a universal coupling 50. The shaft is disposed at an angle to the axis of the shear drum 44 similarly to the arrangement described hereinbefore for intermediate shaft 14. The opposite end of the shaft 48 has a beveled gear 52 keyed or otherwise attached thereto. Gear 52 meshes with another gear 54 which is affixed to the end of a drive shaft 56. Rotation of the drive shaft 56 imparts rotative movement of the shear drum 44 through the gear 54 and gear 52, shaft 48 and coupling 50. As described for the preferred embodiment of my invention above, the arrangement of shaft 48 and the coupling 50 result in the transformation of a constant speed rotation of the drive shaft 56 into a fluctuating rotation of the shear drum 44 so as to provide alternate acceleration and deceleration phases in the revolution of the shear drum 22.

The shaft 48 revolves within a sleeve 58 which has a bracket or web 60 projecting therefrom to an integral projection of a sleeve 62 which houses a pivot shaft 64. The pivot shaft 64 is axially aligned with the coplanar axes of the shear drum 44 and the drive shaft 56. A sector gear 66 and worm 68 may be provided for adjusting the shaft 48 and gear 52 about the pivot shaft 64 so as to vary the degree of acceleration at the time of cut as hereinbefore described.

While one embodiment of my invention has been shown and described, it will be apparent that other adaptations and modifications may be made without departing from the scope of the following claims.

I claim:
1. A variable-speed drive for a rotary shear including a pair of cooperating parallel cylindrical shear drums each rotating about its longitudinal axis which comprises an intermediate shaft disposed at an acute angle to the axis of one of said drums, a universal coupling connecting said shaft and said one of said drums, means connected with said intermediate shaft for driving the same, means mounting said intermediate shaft for rotation about said axis of said one of said drums, said last named means being a bearing bracket mounted for bodily movement about said axis of said one of said drums, a gear rigid with said bracket, and means for driving said gear.

2. A variable-speed drive for a rotary shear including a pair of cooperating parallel cylindrical shear drums each rotating about its longitudinal axis which comprises an intermediate shaft disposed at an acute angle to the axis of one of said drums, a universal coupling connecting said shaft and said one of said drums, means connected with said intermediate shaft for driving the same, said driving means including a drive shaft coaxial with said axis of said one of said drums, and meshing bevel gears on said drive shaft and said intermediate shaft, respectively, and means mounting said intermediate shaft for rotation about said axis of said one of said drums.

3. A variable-speed drive for a rotary shear including a pair of cooperating parallel cylindrical shear drums each rotating about its longitudinal axis which comprises an intermediate shaft disposed at an acute angle to the axis of one of said drums, a universal coupling connecting said shaft and said one of said drums, means connected with said intermediate shaft for driving the same, said driving means including a drive shaft coaxial with said axis of said one of said drums, a third shaft parallel to said drive shaft, meshing spur gears on said drive shaft and said third shaft, respectively, and a second universal coupling between said third shaft and said intermediate shaft, and means mounting said intermediate shaft for rotation about said axis of said one of said drums.

References Cited in the file of this patent
UNITED STATES PATENTS

| 1,543,368 | Carrier | June 23, 1925 |
| 1,706,276 | Zweigbergk | Mar. 19, 1929 |

FOREIGN PATENTS

| 620,670 | France | Apr. 7, 1927 |